United States Patent [19]

Mumford

[11] Patent Number: 4,581,054
[45] Date of Patent: Apr. 8, 1986

[54] GLASS FEEDER ORIFICE RING AND HOLDER

[75] Inventor: Eustace H. Mumford, Ottawa Lake, Mich.

[73] Assignee: Owens-Illinois, Inc., Toledo, Ohio

[21] Appl. No.: 698,479

[22] Filed: Mar. 18, 1985

Related U.S. Application Data

[63] Continuation of Ser. No. 496,722, May 20, 1983, abandoned.

[51] Int. Cl.⁴ .............................................. C03B 7/08
[52] U.S. Cl. ...................................... 65/328; 65/126; 65/325
[58] Field of Search ................. 65/325, 326, 327, 328, 65/126, 221

[56] References Cited

U.S. PATENT DOCUMENTS

| | | | |
|---|---|---|---|
| 1,608,967 | 11/1926 | Tucker | 65/325 |
| 2,075,756 | 3/1937 | Barker | 65/325 |
| 2,485,807 | 10/1949 | Berthold | 65/328 |
| 2,654,185 | 10/1953 | Honiss | 65/325 |
| 3,516,812 | 6/1970 | Donnelly | 65/328 |
| 3,625,671 | 12/1971 | Schirm | 65/326 |

Primary Examiner—Kenneth M. Schor
Attorney, Agent, or Firm—John R. Nelson

[57] ABSTRACT

An orifice ring and its holder are disclosed in detail, particularly as to the manner in which the ring is positioned within the holder or pan. The pan is formed with locating slots within which locating keys on the holder are to be positioned. Furthermore, the orifice holder or pan is provided with a precisely formed, horizontally extending slot along the center line of the diameter thereof which defines the four orifice openings. Vertical, side-locating pads, of which there are four in number on the bottom of the orifice ring, define parallel vertical planes at opposed sides of the orifices. These vertical planes coincide with the vertical planes defined by the horizontal slot formed in the pan. Four seating pads formed on the ring define a horizontal plane that is parallel to the top of the orifice ring. These seating pads support the ring in the bottom of the pan. These pads are juxtaposed the side-locating pads. In this manner, precise location of the orifice relative to the pan is provided.

3 Claims, 7 Drawing Figures

GLASS FEEDER ORIFICE RING AND HOLDER

This is a continuation of application Ser. No. 496,722 filed May 20, 1983, now abandoned.

BACKGROUND OF THE INVENTION

Orifice rings and holders in the past for single, double and triple gob discharge openings have been generally set up such that the orifice ring holder will have round locating holes formed in the bottom thereof, these holes being of a diameter that is comparable to the diameter of the molded orifice ring bottom which would fit within these ring locating holes.

One of the problems experienced with this set-up is that in the event the orifice ring is warped, as happens on occasion, particularly when of a large diameter, it will not be satisfactorily supported by the orifice pan and will result in leaks.

Another important consideration in supporting an orifice ring in the feeder orifice of a glass feeder, particularly of the multiple gob type, is that the individual feeder orifices in the ring must be maintained with an orientation such that they are coaxial with vertically positioned plungers that are reciprocated within the feeder bowl. When these rings are improperly seated or placed, the axes of their orifice openings may not be coincidental with the axis of the plungers, and it is an object of the present invention to provide an improved system for assuring the proper alignment and seating of the orifice ring relative to the feeder bowl.

It is a further object of this invention to provide an orifice ring and pan or holder combination which assures the support of the ring against the bottom of the bowl with uniform force and with the proper alignment.

SUMMARY OF THE INVENTION

This invention provides an improved orifice ring and holder for a multiple gob glass feeder, wherein the cylindrical pan or holder having an elongated slot formed therein, carries the orifice ring and supports the orifice ring on the flat inner bottom thereof. The pan is provided at opposed sides of an elongated slot in the bottom with locating slots extending transverse thereto and the orifice ring is made with a plurality of flat raised surfaces which will be supported on the bottom of the pan and by keys which will locate the ring properly when within the locating slots formed in the pan to thus provide an orifice ring and holder combination with precise location of the ring relative to the pan.

DETAILED DESCRIPTION OF THE DRAWINGS

Figure 1:
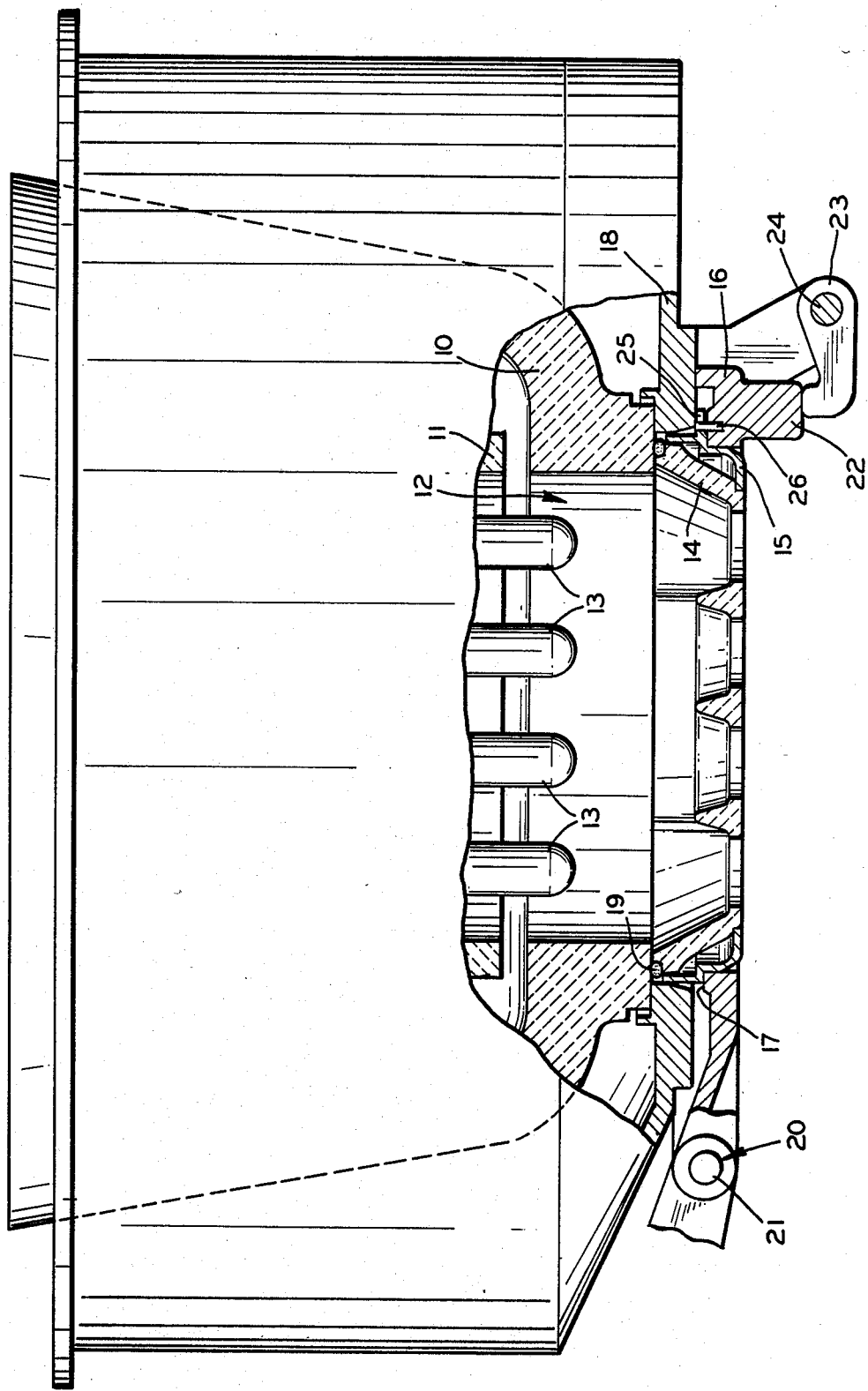
FIG. 1 is a vertical, cross-sectional view through a portion of a feeder with the holder and orifice ring of the invention applied thereto.

With particular reference to FIG. 1, the orifice ring and holder of the invention will be described in the environment of its use. As shown in FIG. 1, a feeder bowl 10, formed of ceramic material, has the usual tube 11 positioned therein concentric with the lower feeder orifice, designated 12. The tube 11, in coopertion with the inner ledge of the feeder 10, will determine the quantity of glass entering into the area of the feeder orifice 12. Also within the area of the feeder orifice, and within the confines of the rotating tube 11, are positioned four vertical plungers 13. In the operation of the feeder 10, the plungers 13 are reciprocated in timed sequence, with all being reciprocated together as a unit under normal operating conditions. The orifice 12 is closed by a ceramic orifice ring, generally designated 14. The orifice ring 14 will be described in greater detail with reference to FIGS. 4–7. The orifice ring 14 is supported in a holder or pan 15.

The holder 15 will be described in somewhat greater detail with reference to FIGS. 2 and 3. Suffice it to say, the holder 15 is a generally cylindrical metal pan having a planar bottom surface with the orifice ring 14 supported by the holder in its operative position as shown in FIG. 1. The pan 15 is supported and held in the operative position by a metal ring-like member 16, which extends about and embraces the pan 15 with the pan resting on an upper ledge 17 of the support ring 16. The feeder 10, which is ceramic and has a bowl-like configuration, is supported in the position shown by a metal frame 18, only a portion of which is shown in FIG. 1. This frame 18 has an opening, as shown in FIG. 1, which is somewhat larger than the orifice 12 in the feeder bowl 10. The holder or pan 15 and the ring 14 extend through the opening in the frame 18 beneath the feeder bowl 10. The ceramic orifice ring 14 carried by the pan 15 is held against the lower surface of the feeder bowl and a sealing material 19 is interposed between the upper surface of the orifice ring and the lower surface of the feeder bowl 10. In the past this sealing material 19 took the form of an asbestos rope; however, presently the material is of a non-asbestos composition capable of withstanding high temperature without becoming distorted, and thereby prevents leakage of glass through any opening that might otherwise appear between the orifice ring 14 and the lower surface of the feeder bowl.

The metal ring 16 is pivotally mounted at 20 to a fixed pivot pin 21. Diametrically opposite to the pin 21, the ring 16 has a downwardly extending boss portion 22 that is engaged by a clamp lever 23 which pivots about a shaft 24. The lever 23 is locked in its engaging position, as shown in FIG. 1, by a suitable operating mechanism (not shown). The pan 15, as best shown in FIG. 2 at the left side thereof, is provided with an outwardly extending, bifurcated flat plate or tongue 25. This plate 25 engages with a vertical pin 26 carried by the ring 16, thus accurately locating the pan 15 in the ring 16.

Figure 2:
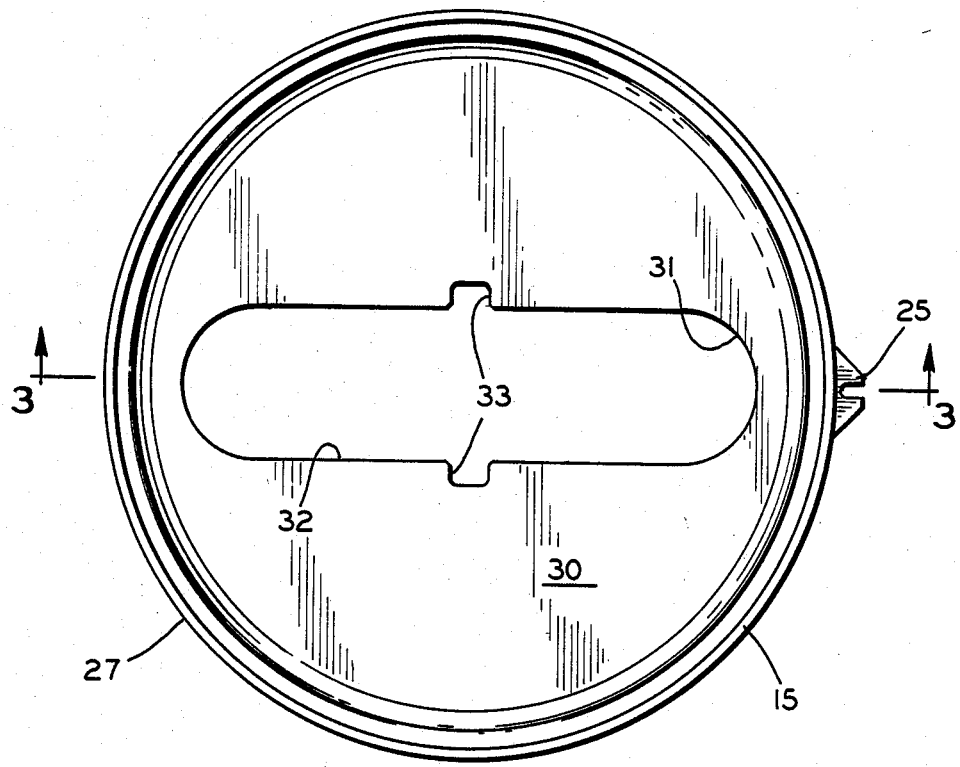
FIG. 2 is top plan view of the holder of the invention.
Figure 3:
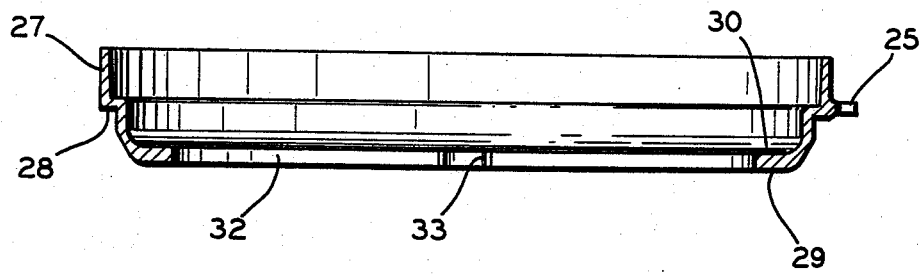
FIG. 3 is a cross-sectional view taken at line 3—3 of FIG. 2.

Turning now to FIGS. 2 and 3, it can be seen that the pan 15 is generally comprised of a cylindrical wall 27 having an inwardly stepped portion 28, this stepped portion 28 being the area which fits within the ring 16 and is supported by the ledge 17 of the support ring 16. The bottom of the pan 15 is a generally horizontally extending flat member 29 having a planar upper surface 30. An elongated opening 31 extends nearly the full diameter of the bottom 29 of the pan 15 and runs generally in the direction of the plate 25. This opening 31 is to accommodate the four feeder orifices found in the orifice ring. The opening 31, intermediate the length of its two parallel sides 32, is provided with a pair of ring locating slots 33. As best shown in FIG. 2, the slots 33 are generally rectangular and extend radially outwardly with respect to the central axis of the cylindrical pan 15.

Figure 4:
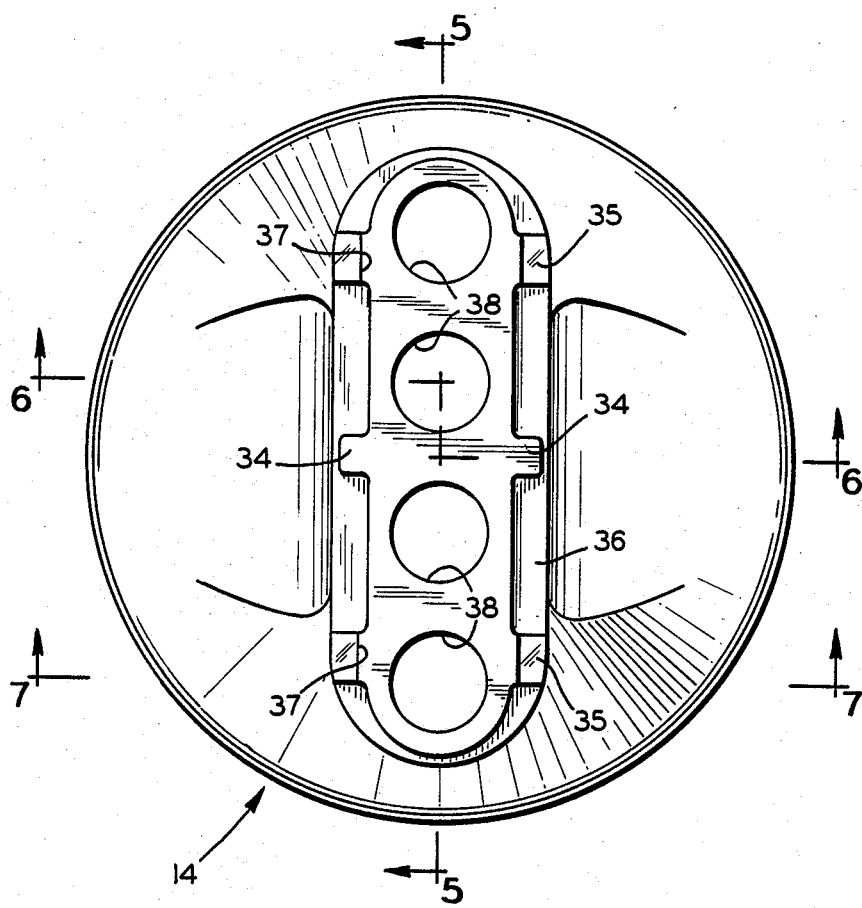
FIG. 4 is a bottom, plan view of the orifice ring of the invention.
Figure 5:
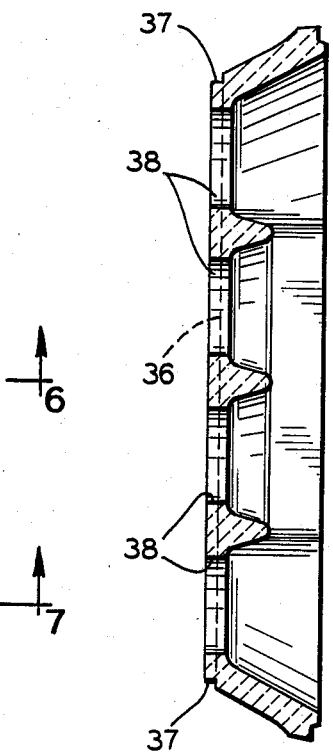
FIG. 5 is a cross-sectional view taken at line 5—5 of FIG. 4.
Figure 6:
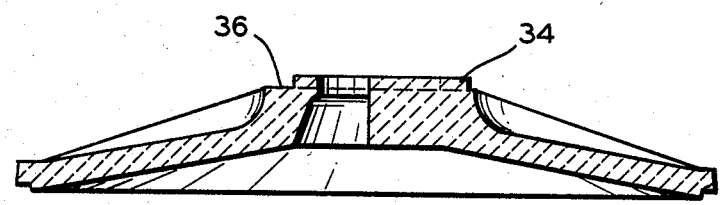
FIG. 6 is a cross-sectional view, on an enlarged scale, taken at line 6—6 of FIG. 4.
Figure 7:
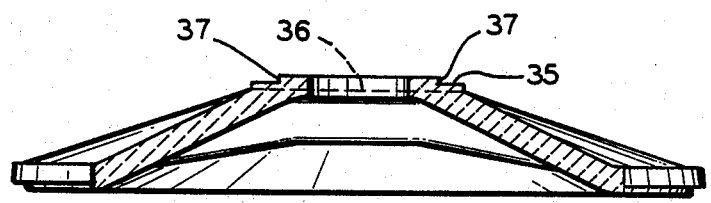
FIG. 7 is a cross-sectional view, on an enlarged scale, taken at line 7—7 of FIG. 4.

Turning now to FIGS. 4-7, the orifice ring itself will be described in detail, and the manner of its mounting in the orifice ring holder or pan 15 will also be described. The ring 14 is made of a ceramic material and is normally cast in a mold when being made and fired to set the material into a precise shape. It should be pointed out that it is extremely important that the orifice ring seat within the pan so that its upper surface, which is to be sealed against the lower surface of the feeder bowl, will be parallel to the bottom of the orifice pan 15 when they are assembled. In order to assure that this occurs, and also that the ring 14 is precisely and accurately positioned centerwise of the pan 15, the orifice ring 14 is formed with a pair of locating keys 34 in the bottom surface thereof. The keys 34 are intended, upon assembly with the pan 15, to be located within the ring-locating slots 33. In addition to the keys 34, the orifice ring 14 is formed with four horizontal seating pads 35. The seating pads 35 extend 1/16 inch below the adjacent bottom surface 36 of the orifice ring 14. These pads are accurately formed and the four of them, as shown in FIG. 4, are made to be precisely parallel with the upper sealing surface of the orifice ring. At the inside edges of the pads 35 and juxtaposed thereto are downwardly and outwardly facing vertical locating surfaces or pads 37 which fit within and are located along the sides 32 of the elongated opening 31. These side-locating pads, as seen in FIG. 4, extend outward slightly relative to the general dimension of the downwardly extending areas 39, which form orifices 38. Thus it can be seen that when the orifice ring 14 is assembled in the orifice pan 15, the pad 35 will rest on the planar surface 30 of the bottom 29 of the pan 15. Additionally, the keys 34 will be located in the ring-locating slots 33 and the surfaces of the side-locating pads 37 will accurately position the orifice ring within the precise center of the pan 15. The four orifice openings 38 extend through the bottom of the orifice ring and are located on centers which are on a precise diameter of the ring 14 and are spaced apart equidistant along this diameter. Furthermore, each of the orifices 38 is to be a true circle as is necessary in order to provide precise, accurate feeding of molten glass where all of the mold charges or gobs are of the same weight. The area between the pan 15 and the orifice 14, when in their assembled relationship as shown in FIG. 1, is filled with a packed insulating material to provide heat insulation to the ring 14 in order to obtain a uniform thermal radiation and conduction from the orifice ring 14 about its circumference.

Thus it can be seen that an orifice ring and the holder or pan for supporting the orifice ring, which has four glass feeding orifices formed therein, is provided, and which may be accurately positioned and held in the orifice opening of a glass feeder bowl.

While the foregoing description has been in conjunction with a quadruple orifice ring and holder, it should be apparent that the number of orifices in the ring could be more or less than that shown without departing from the spirit and scope of the invention.

Furthermore, the keys 34 in the orifice ring provide the mechanism for locating the orifice ring relative to the pan in the direction of the centers of the orifices. Because the keys 34 are of a fairly small dimension, they do not expand under heat from the glass to any appreciable extent and cause the ring to crack as has been a problem in the prior art arrangements. Although the small keys 34 are a preferred longitudinal position locating means for the ring in the pan, alternative locating means in the form of downwardly extending surfaces at the extreme ends of the ring would be capable of providing this longitudinal centering function.

It would, however, require some care in designing the ring so that it would have sufficient clearance with the ends of the hole in the pan, that expansion of the ring on heat-up with molten glass would not cause expansion to the extent that the ring would break, but would accurately locate the ring in the longitudinal direction of the opening in the same manner as the surfaces 37 locate the ring sideways in the opening in the pan.

I claim:

1. A combination multiple gob orifice ring and holder for a molten glass feeder wherein said holder comprises a hollow cylindrical pan having a planar circular bottom, said circular bottom having formed in it an elongated, diametrically extending opening, said opening extending symmetrically along a diameter of the pan bottom to both sides of the pan, side walls of said elongated opening which side walls are substantially parallel to said diameter of said pan bottom and which side walls extend downwardly and form two pairs of parallel, inwardly facing vertical surfaces, said opening further being of sufficient length to encompass a plurality of linearly aligned, vertical discharge orifices extending downwardly from an orifice ring telescopically seated therein, and wherein said multiple gob orifice ring comprises a generally dish-shaped ceramic member seated within said pan, said member being circular, in horizontal section, at its top and having an outer wall which tapers downwardly and inwardly toward the bottom where said wall surrounds and forms a plurality of linearly aligned glass discharge orifices with their vertical axes lying in a plane passing through a diameter of the circular top of said member and where said member has a horizontal bottom, the lower portion of said member extending through the elongated opening in the pan, with two pairs of spaced apart, planar outwardly facing vertical surfaces extending upwardly from the horizontal bottom surface of said member for a distance substantially equal to the thickness of said pan bottom and said outwardly facing vertical surfaces mating with and engaging said inwardly facing vertical surfaces of said elongated opening in said pan bottom for precisely locating said member in said pan with said diameter of said pan being coincidental with said diameter of said member; the lower portion of said member having outwardly facing side walls extending downwardly to meet said horizontal bottom and said outwardly facing vertical surfaces being structured such that they protrude outwardly from the side walls of the member so that said outwardly facing vertical surfaces mate with and engage said inwardly facing vertical surfaces, while the side walls of the member do not; said orifice ring further including horizontal pads with lower surfaces which extend outwardly of said member from the upper end of said pairs of planar outwardly facing vertical surfaces, said horizontal surfaces being in engagement with the upper surface of the pan bottom, and defining a horizontal plane which is parallel to the horizontal bottom surface of said ring.

2. The improved orifice ring and holder combination of claim 1 wherein said pan bottom has a pair of small radial slots formed therein, said slots extending radially outward from and at right angles with respect to said parallel surfaces of said elongated opening in said pan bottom, and a pair of horizontally extending keys integrally formed in said bottom of said member and extending within and engaging the sides of said slots for accurately positioning the mid-point of the diameter of said member with the mid-point of the diameter of said pan bottom.

3. The improved orifice ring and holder of claim 2 wherein said orifice ring is formed with four aligned discharge orifices therein and said locating keys extend normal to the mid-point of a line joining the centers of said orifices.

* * * * *